(12) United States Patent
Hauptmann et al.

(10) Patent No.: US 6,537,439 B2
(45) Date of Patent: Mar. 25, 2003

(54) METHOD AND APPARATUS FOR RECOVERING A REACTION PRODUCT PRODUCED AT A SURFACE

(75) Inventors: Edward Gerald Hauptmann, West Vancouver (CA); Clive M. H. Brereton, Richmond (CA); Glenn R. Stefurak, Maple Ridge (CA)

(73) Assignee: Noram Engineering & Constructors Ltd., Vancouver (CA)

( * ) Notice: Subject to any disclaimer, the term of this patent is extended or adjusted under 35 U.S.C. 154(b) by 69 days.

(21) Appl. No.: 09/770,609

(22) Filed: Jan. 29, 2001

(65) Prior Publication Data

US 2001/0023831 A1 Sep. 27, 2001

Related U.S. Application Data

(63) Continuation-in-part of application No. PCT/CA99/00680, filed on Jul. 27, 1999, which is a continuation of application No. 09/123,199, filed on Jul. 27, 1998, now abandoned.

(51) Int. Cl.[7] .................................................. C25C 1/12
(52) U.S. Cl. ...................... 205/574; 205/291; 205/668; 204/275.1; 204/281
(58) Field of Search ................................. 205/350, 668, 205/291, 574; 204/275.1, 281

(56) References Cited

U.S. PATENT DOCUMENTS

| | | | | |
|---|---|---|---|---|
| 3,787,244 A | * | 1/1974 | Schulmeister | 136/120 FC |
| 3,893,902 A | * | 7/1975 | Loftfield | 204/95 |
| 5,246,025 A | * | 9/1993 | Cawlfield | 134/102.2 |
| 5,437,421 A | * | 8/1995 | Nosenchuck | 244/205 |
| 5,635,039 A | * | 6/1997 | Cisar | 204/252 |

OTHER PUBLICATIONS

Bockris et al., Chapter 8 entitled "The Electrified Interface" Oct. 1973, Plenum Press, vol. 2 pp. 855–859.*

* cited by examiner

*Primary Examiner*—Arun S. Phasge

(57) ABSTRACT

A method and apparatus are described for removing a chemical product species produced by electrochemical action at an electrode or by a chemical reaction which occurs at the surface of a solid catalyst. The method involves providing a flow of a host solution generally parallel to a surface at which a chemical reaction occurs. The flow of the host solution causes the products from the chemical reaction to be entrained in a thin boundary layer which moves along the surface. These products can be removed from a cell by withdrawing the boundary layer from the cell as it reaches the trailing edge of the surface.

39 Claims, 9 Drawing Sheets

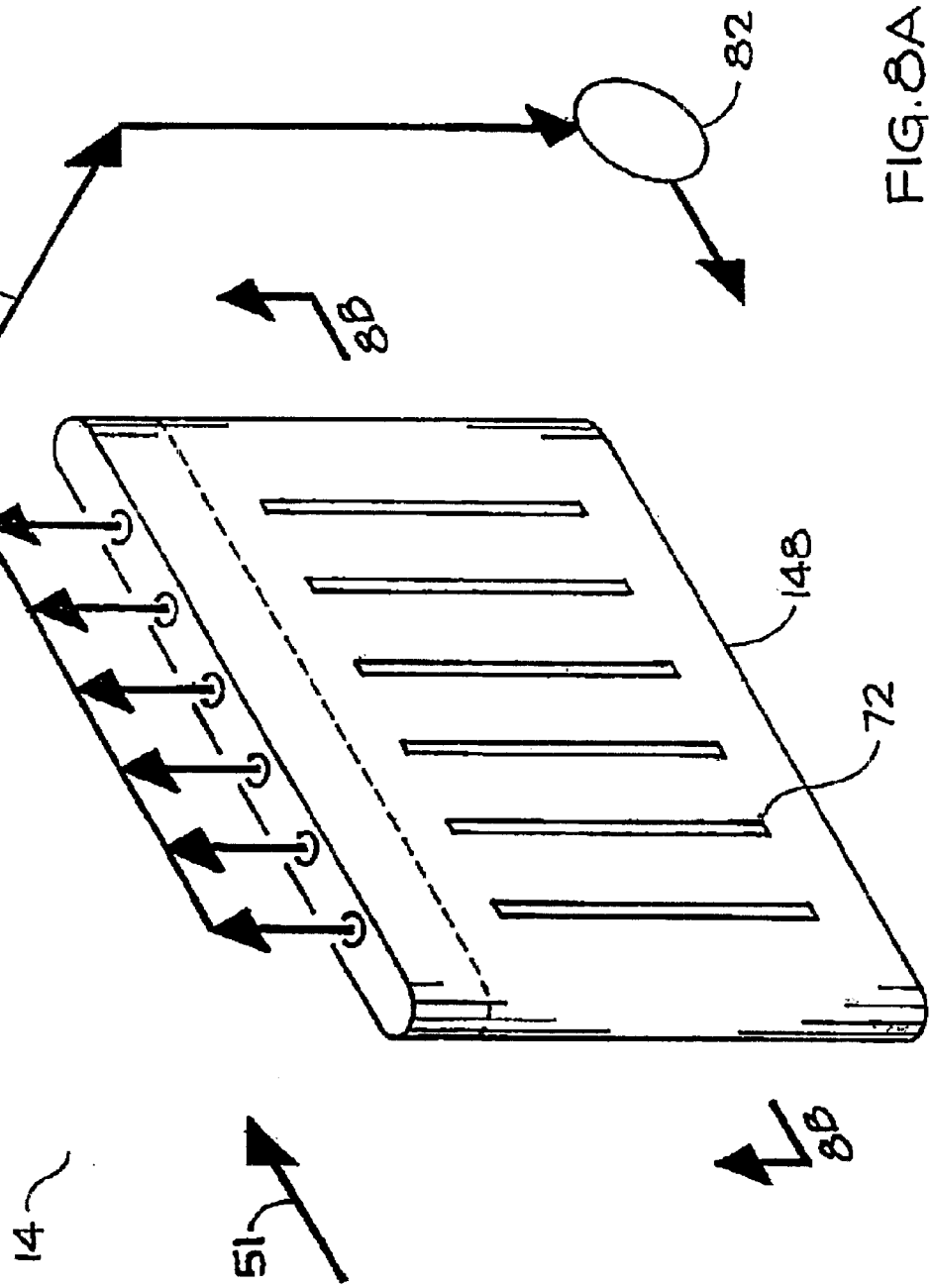

METHOD AND APPARATUS FOR RECOVERING A REACTION PRODUCT PRODUCED AT A SURFACE

CROSS REFERENCE TO RELATED APPLICATIONS

This application is a continuation-in-part of application No. PCT/CA99/00680 which designates the United States of America and is entitled METHOD AND APPARATUS FOR RECOVERING A REACTION PRODUCT PRODUCED AT A SURFACE which is, in turn, a continuation of U.S. patent application Ser. No. 09/123,199 filed Jul., 27, 1998.

TECHNICAL FIELD

This invention relates to methods and apparatus for recovering reaction products from surfaces. The invention may be applied to recovering a reaction product formed at the surface of an electrode in an electrochemical cell. The invention may also be applied to recovering a product of a catalysed chemical reaction from the surface of a catalyst. The invention has particular application in collecting reaction products generated at the anodes or cathodes of electrochemical cells used for electrical refining and electrowinning of metals. Another aspect of the invention relates to electrochemical cells adapted to be operated according to the methods of the invention.

BACKGROUND

In some industrial chemical processes, chemical reaction products are produced at electrodes which are immersed in a bath of electrolyte as part of an electrochemical cell. It is often desirable to remove such reaction products before they can intermingle with other species in the electrolyte. The reaction products may be desirable in their own right or it may be necessary to remove them from the cell to prevent them from interfering with other chemical processes taking place within the cell.

For example, some processes for producing copper metal involve leaching copper sulphide ores with an acidic solution containing an oxidizing agent such as ferric ions ($Fe^{3+}$). The copper dissolves leaving behind elemental sulfur by the reaction:

$$Cu_2S + 4Fe^{3+} \rightarrow 2Cu^{2+} + 4Fe^{2+} + S_0 \quad (1)$$

Copper metal is then recovered from the resulting copper-containing solution by an electrowinning step. The electrowinning step takes place in an electrochemical cell containing a cathode, an anode and an electrolyte containing the cupric ($Cu^{2+}$) ions. When electrical current is passed through the cell from the cathode to the anode, copper metal is plated onto the cathode by a process involving the reaction:

$$Cu^{2+} + 2e^- \rightarrow Cu \quad (2)$$

At the anode, ferrous ($Fe^{2+}$) ions are converted to ferric ions by the reaction:

$$Fe^{2+} \rightarrow Fe^{3+} + e^- \quad (3)$$

If the ferric ions so created are allowed to co-mingle with the electrolyte then they may ultimately return to the cathode where they will be converted back to ferrous ($Fe^{2+}$) ions. This reduces the efficiency with which copper metal is plated onto the cathode. The inventors have recognized that this also results in a loss of opportunity to use the ferric ions in other parts of the overall process.

There are various means currently being used to prevent species produced at an electrode in an electrochemical cell from interfering with electrochemical processes taking place at the other electrode. One approach is to use a divided cell. A divided cell has a barrier between the electrodes. The barrier is permeable to charge carriers but has a low permeability to the species in question, The barrier nay comprise a suitable diaphragm or membrane. A disadvantage of divided cells is that the membrane introduces electrical resistance which increases power consumption. The membrane also adds both capital and maintenance expense, can degrade over time and may become plugged.

In some cases a reaction product produced at an electrode in an electrochemical cell is a desired product which should be recovered. The prior art provides various ways to recover such reaction products. In general, these methods all make it necessary to withdraw a substantial amount of electrolyte, together with the reaction product which is being collected. For example, in cells where the desired reaction product is much less dense than the electrolyte then the desired reaction product may be obtained by withdrawing the top portion of the electrolyte. In some prior art devices, the electrodes are themselves porous, thereby allowing the reaction products produced at the electrodes, together with some electrolyte, to be withdrawn through the electrodes. Porous electrodes are susceptible to becoming plugged with small particles of sediment or the like which are often present in electrochemical cells. In general, all of these processes allow the desired species to mix with a substantial quantity of electrolyte as it is being removed. Therefore, the concentration of the desired reaction product removed from the cell is relatively low. Subsequent concentration steps are often required.

Another example of a situation where a desired species is created at a surface is a process which uses a solid catalyst to promote a reaction involving species in the fluid to produce a reaction product at the surface of the catalyst.

There exist systems for water hydrolysis which have a pair of very closely spaced electrodes. Water flows between the electrodes. The close spacing of the electrodes forces laminar flow of the water between the electrodes. Acidic water can be drawn off through a slit. Such systems could not be effectively used in industrial settings where the very narrow space between the electrodes would be susceptible to becoming plugged with debris. Examples of such systems are disclosed in Patent Abstracts of Japan No. JP-A-08168767 and U.S. Pat. No. 5,534,120.

There is a continuing need for methods and apparatus capable of efficiently collecting dissolved reaction products produced at a surface in an electrochemical cell or a catalyst. There is a particular need for such apparatus and methods which can be practised on an industrial scale with a minimum of maintenance.

SUMMARY OF THE INVENTION

This invention creates a condition in which an electrolyte, or other fluid, flows in a thin boundary layer across a surface at which a reaction product is generated. The reaction product enters the fluid flowing in the boundary layer and is carried by the flowing fluid to a collection zone. Fluid containing the reaction product is removed at the collection zone. Various flow conditions in which the boundary layer does not mix significantly with the bulk of fluid adjacent the surface may be used to practise the invention.

A specific embodiment of the invention provides a method for recovering a reaction product at a surface. The method comprises the steps of: providing a surface immersed in a fluid; causing the fluid to flow past the surface so as to cause fluid in a boundary layer region adjacent the surface to flow across the surface from an upstream side of the surface to a downstream side of the surface without mixing substantially with fluid from outside of the boundary layer region; allowing a reaction product to form at the surface; allowing the fluid flowing in the boundary layer region to carry the reaction product across the surface toward a downstream collection zone; and, at the collection zone, collecting fluid flowing in the boundary layer region together with the reaction product being carried by the fluid flowing in the boundary layer region. By applying this method the collected reaction product can be obtained in a form which is much more concentrated than would be the case it the reaction product was simply allowed to mix with the fluid.

In the method of the invention the surface may be a surface of a catalyst where the reaction product is formed by a chemical reaction catalysed by the catalyst. In the alternative, the surface could be a surface of an electrode where the reaction product is formed by an electrochemical reaction. In one exemplary preferred embodiment the reaction product comprises ferric ions produced at an electrode surface by oxidation of ferrous ions.

The step of collecting the fluid flowing in the boundary layer region preferably comprises drawing fluid flowing in the boundary layer region into an elongated aperture extending transversely to the direction of fluid flow as the fluid flowing in the boundary layer region arrives at the collection zone. Most preferably the elongated aperture comprises an elongated slot extending transversely to a direction of the boundary layer flow.

Another aspect of the invention provides a method for recovering a reaction product at a surface. The method comprises the steps of: providing a surface immersed in a fluid and fluid driving means for causing the fluid to flow past the surface; operating the fluid driving means to cause the fluid to flow past the surface so as to cause fluid in a boundary layer region adjacent the surface to flow across the surface from an upstream side of the surface to a downstream side of the surface without mixing substantially with fluid outside of the boundary layer region; allowing a reaction product to form at the surface; allowing the fluid flowing in the boundary layer region to carry the reaction product across the surface toward a fluid removal means in a downstream collection zone; and, at the collection zone, operating the fluid removal means to withdraw fluid flowing in the boundary layer together with the reaction product.

Yet another aspect of the invention provides an electrochemical cell comprising: a container holding a liquid electrolyte; first and second electrodes in the container in contact with the electrolyte; electrical conductors for connecting the first and second electrodes respectively to first and second poles of an electrical power supply; fluid driving means for causing electrolyte to flow past a surface of the first electrode with a velocity sufficient to cause the electrolyte in a boundary layer adjacent the surface to flow across the first electrode from an upstream side to a downstream side without mixing significantly with electrolyte from outside the boundary layer; and, fluid removal means at the downstream side of the surface for withdrawing fluid containing a reaction product from the boundary layer.

The fluid removal means preferably comprises an elongated parallel-sided slot oriented generally transversely to a direction of fluid flow in the boundary layer. The slot most preferably has a width in the range of about 1 millimeter to about 1.5 millimeters. An opening according to preferred embodiments of the invention is much more resistant to becoming plugged with debris than a prior art porous electrode.

A further aspect of the invention comprises an electrode assembly for use in an electrochemical cell. The electrode assembly comprises an electrically conductive surface; a first elongated opening extending along an edge portion of the surface; a plenum in fluid communication with the first elongated opening; and, a port connected to the plenum. When the electrode assembly is immersed in an electrolyte, fluid can be drawn into the first elongated opening by applying suction to the port. In some applications it is preferable to provide one or more additional elongated openings in fluid connection with the plenum. The additional elongated openings extend generally parallel to the first elongated opening and are spaced apart on the electrically conductive surface. Withdrawing fluid through the additional openings can help to stabilize flow in a boundary layer adjacent the surface. The additional openings also permit removal of depleted fluid at various points across the electrically conductive surface .

BRIEF DESCRIPTION OF THE DRAWINGS

In drawings which illustrate specific embodiments of the invention, but which should not be construed as restricting the spirit or scope of the invention in any way:

FIGS. 8A and 8B are respectively perspective and sectional views of an electrode according to the invention having a plurality of slots for removing fluid from a boundary layer flowing adjacent a surface of the electrode; and, FIG. 9 is a flow chart illustrating steps in the method of the invention.

DETAILED DESCRIPTION

1. Prior Art

Figure 1:
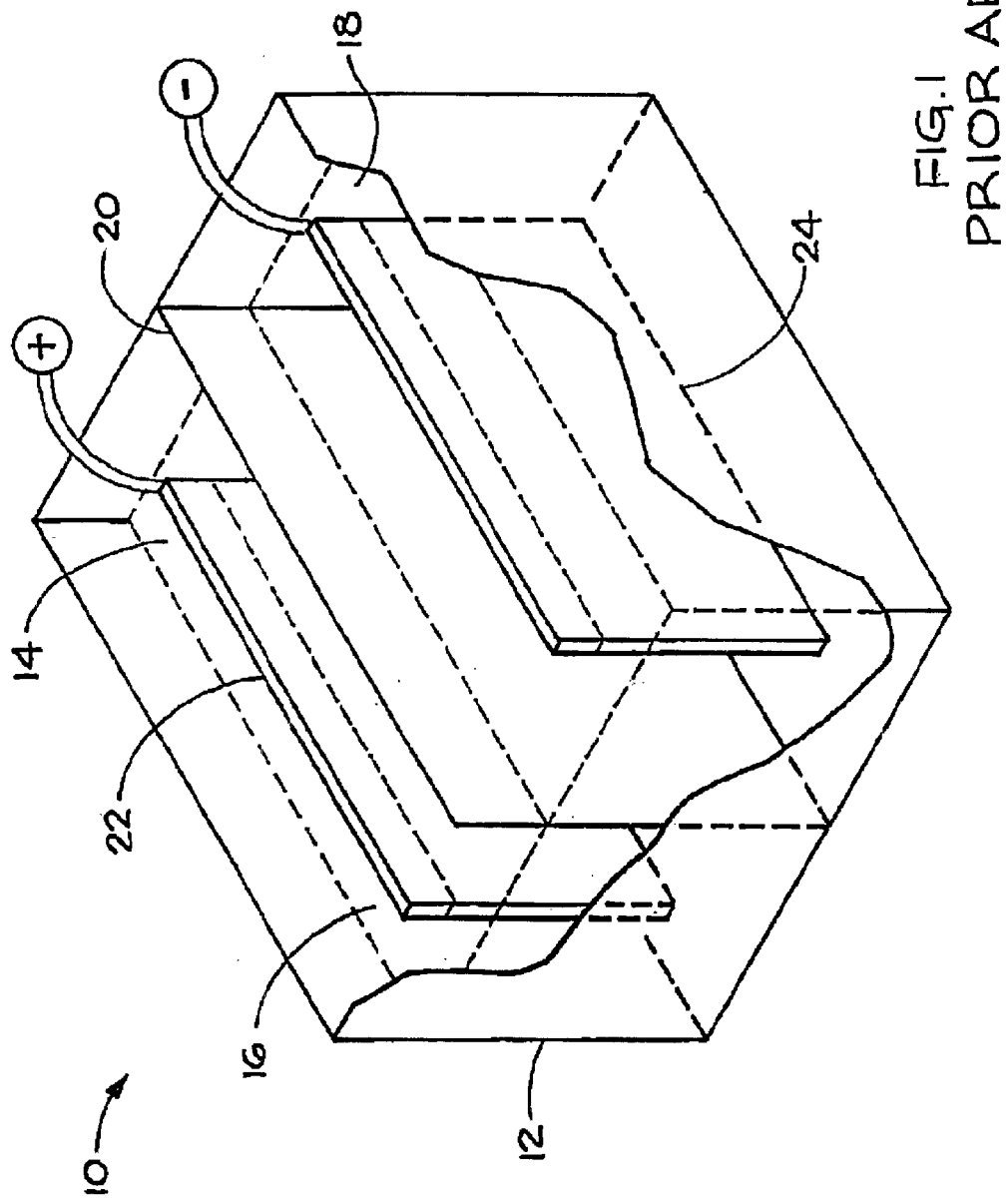
FIG. 1 is a partially schematic, partially cut away, isometric view through a simple prior art divided electrochemical cell.

FIG. 1 shows a partially schematic view of a prior art divided electrochemical cell 10. Electrochemical cell 10 comprises a container 12 containing an electrolyte 14. Container 12 is divided into two volumes 16 and 18 by a diaphragm 20. A conductive cathode plate 22 is immersed in the electrolyte in region 16 and a conductive anode plate 24 is immersed in the electrolyte in region 18. Cathode plate 22 and anode plate 24 are connected respectively to negative and positive terminals of a suitable power supply (not shown). When an electrical current is passed between the cathode and the anode through the electrolyte, chemical reactions occur at the surfaces of the cathode and anode. These chemical reactions release product species into the electrolyte contained within regions 16 and 18 respectively.

Figure 2:
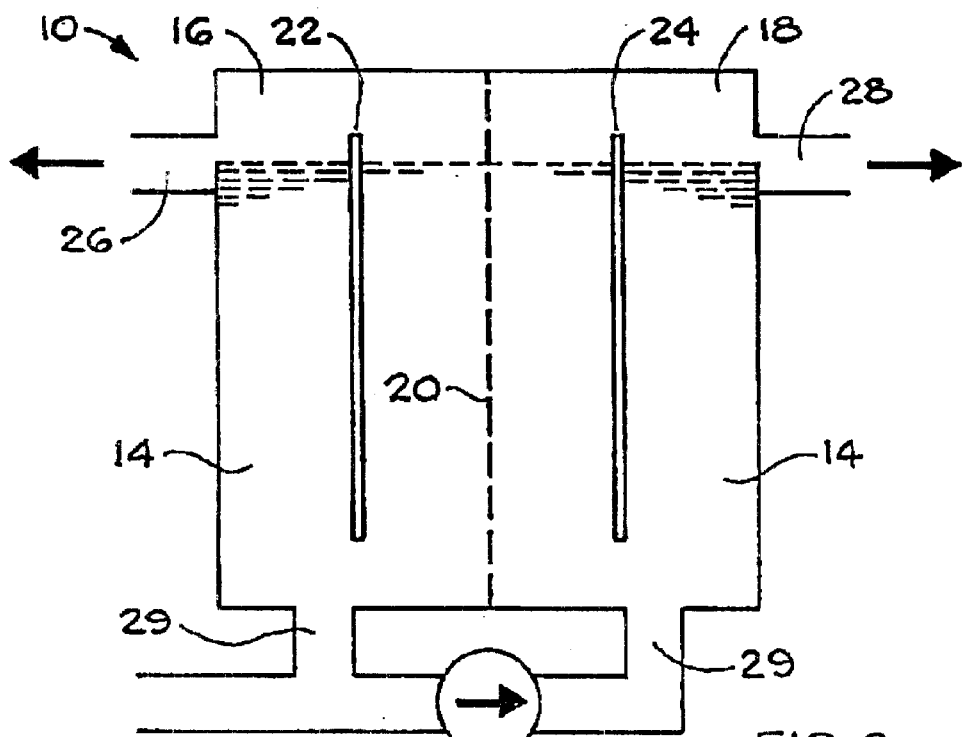
FIG. 2 is a sectional view through a prior art divided cell of the type which permits a reaction product to be retrieved from an upper portion of the cell.

FIG. 2 is a schematic view showing one way to recover the reaction products produced at anode 24 and cathode 22. In the apparatus of FIG. 2, electrolyte is withdrawn from regions 16 and 18 through conduits 26 and 28. Fresh electrolyte is introduced into regions 16 and 18 through conduits 29 in an amount sufficient to replenish the electrolyte removed through conduits 26 and 28. A problem with the apparatus of FIG. 2 is that the product species are withdrawn together with a relatively large amount of electrolyte such that the concentration of product species in the fluid withdrawn through conduits 26 and 28 is relatively low. Subsequent processing steps may be necessary to concentrate the desired species in the effluent removed through conduits 26 and 28.

Figure 3:
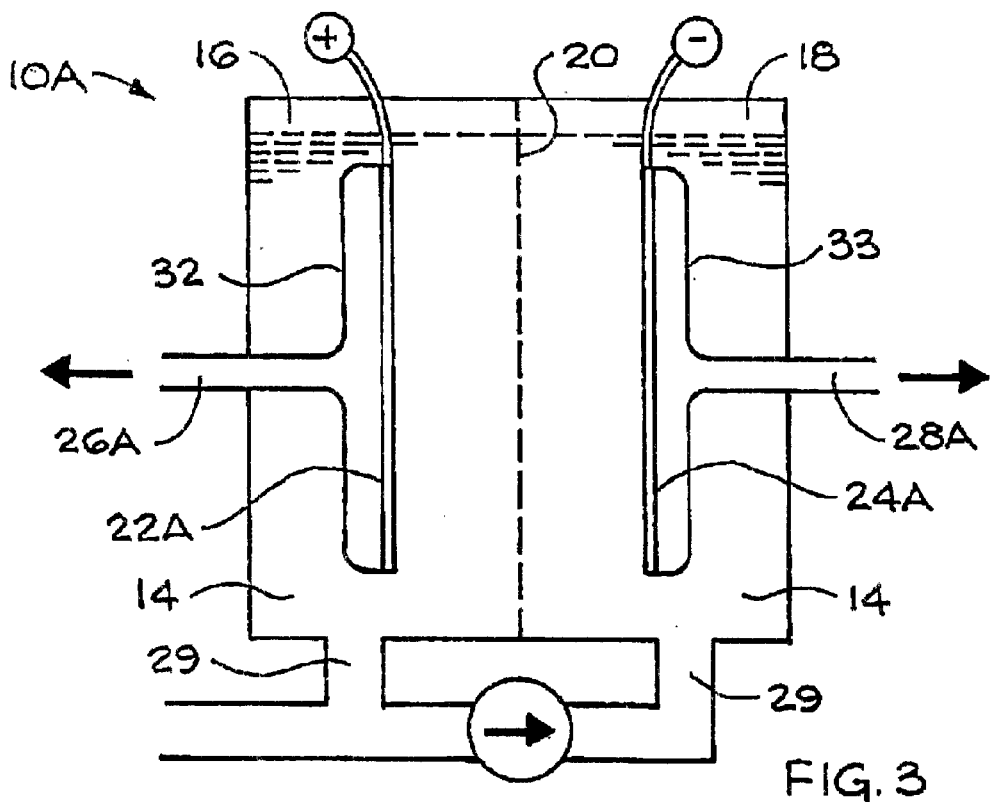
FIG. 3 is a cross-section of a prior art divided cell wherein desired reaction products may be removed by drawing them through porous electrodes.

FIG. 3 shows another approach which is sometimes used to retrieve product species generated at the cathode and/or the electrode of an electrochemical cell. In the cell 10A of FIG. 3, cathode 22A and anode 24A are porous. Each electrode is backed by a plenum chamber 32, 33. Product species may be removed by applying suction through conduits 26A and 28A which are respectively connected to plenum chanter 32 of cathode 22A and plenum chamber 33 of anode 24A respectively. A conduit 29 is provided to replenish the electrolyte in each of chambers 16 and 18 as electrolyte is withdrawn through conduits 26A and 28A. Cell 10A may also suffer from the disadvantage that the product species removed through conduits 26A and 28A is mixed with a relatively large amount of electrolyte and therefore subsequent processing steps are often required to increase the concentration of the product species in the removed fluid. If the pores in the electrodes are reduced in size to reduce the amount of electrolyte withdrawn from regions 16 and 13 with the product species then the porous electrodes 22A, and 24A become prone to plugging.

A disadvantage of divided electrochemical cells generally is that the diaphragm or membrane which divides the cell may be specific to the particular reaction being carried out in the cell. Therefore, such cells are not flexible in their use. Furthermore, the diaphragm or membrane may degrade over time or become plugged. When this happens power is dissipated at the membrane.

DETAILED DESCRIPTION
2. This Invention

This invention creates a condition in which an electrolyte, or other fluid, flows in a thin boundary layer across a surface at which a reaction product is generated. The reaction product is carried by the flowing fluid in the boundary layer to a collection zone. Fluid containing the reaction product is removed at the collection zone. Various flow conditions in which the boundary layer does not mix significantly with the bulk of fluid adjacent the surface may be used to practise the invention. The invention may be practised at a surface which is separated from other surfaces and in conditions where there is turbulence in the bulk flow of the fluid in which the surface is situated.

Figure 9:
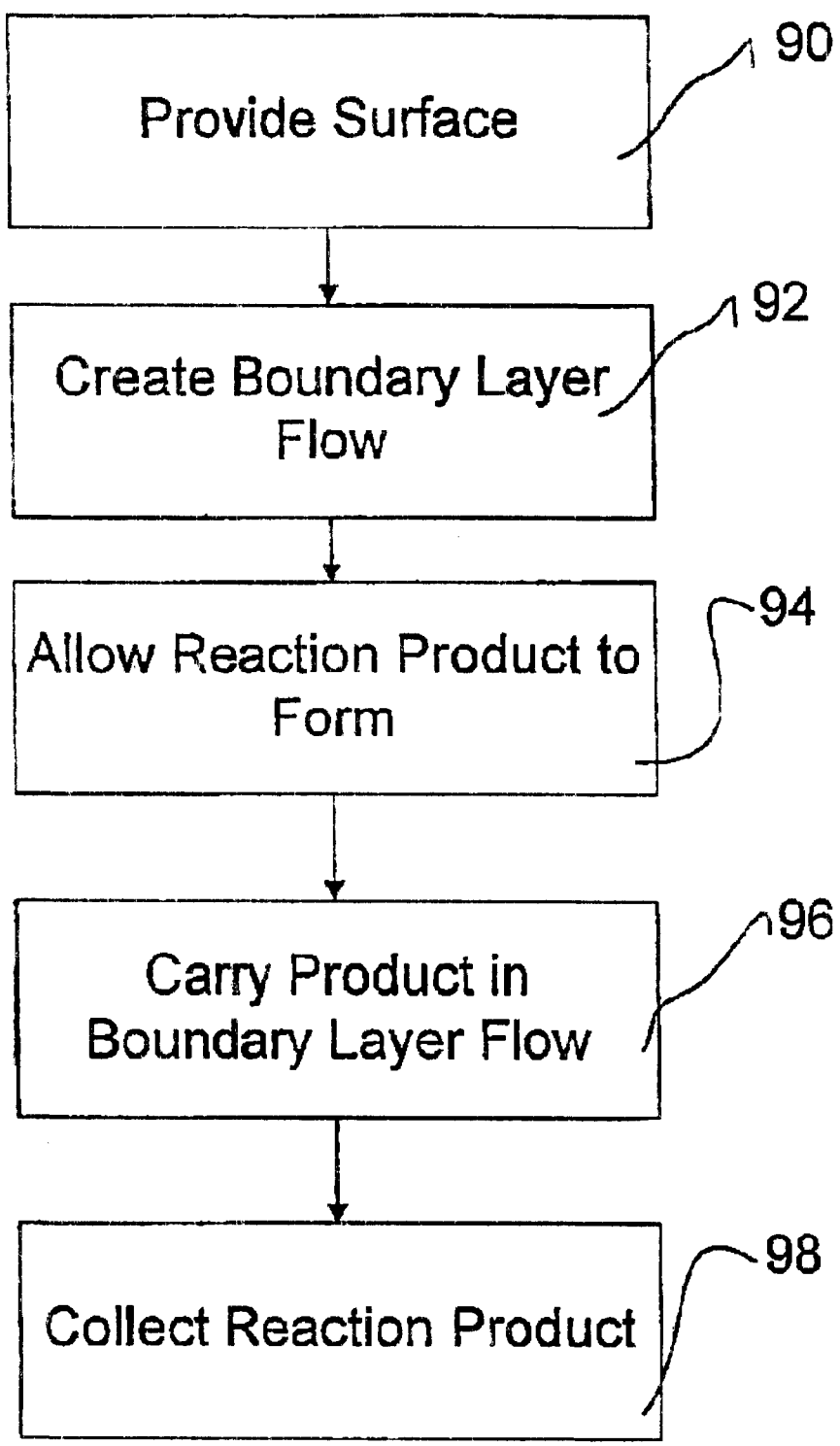

The method of the invention begins by providing a surface immersed in a fluid (step 90, FIG. 9). The surface may, for example be the surface of an electrode in an electrochemical cell.

Figure 4:
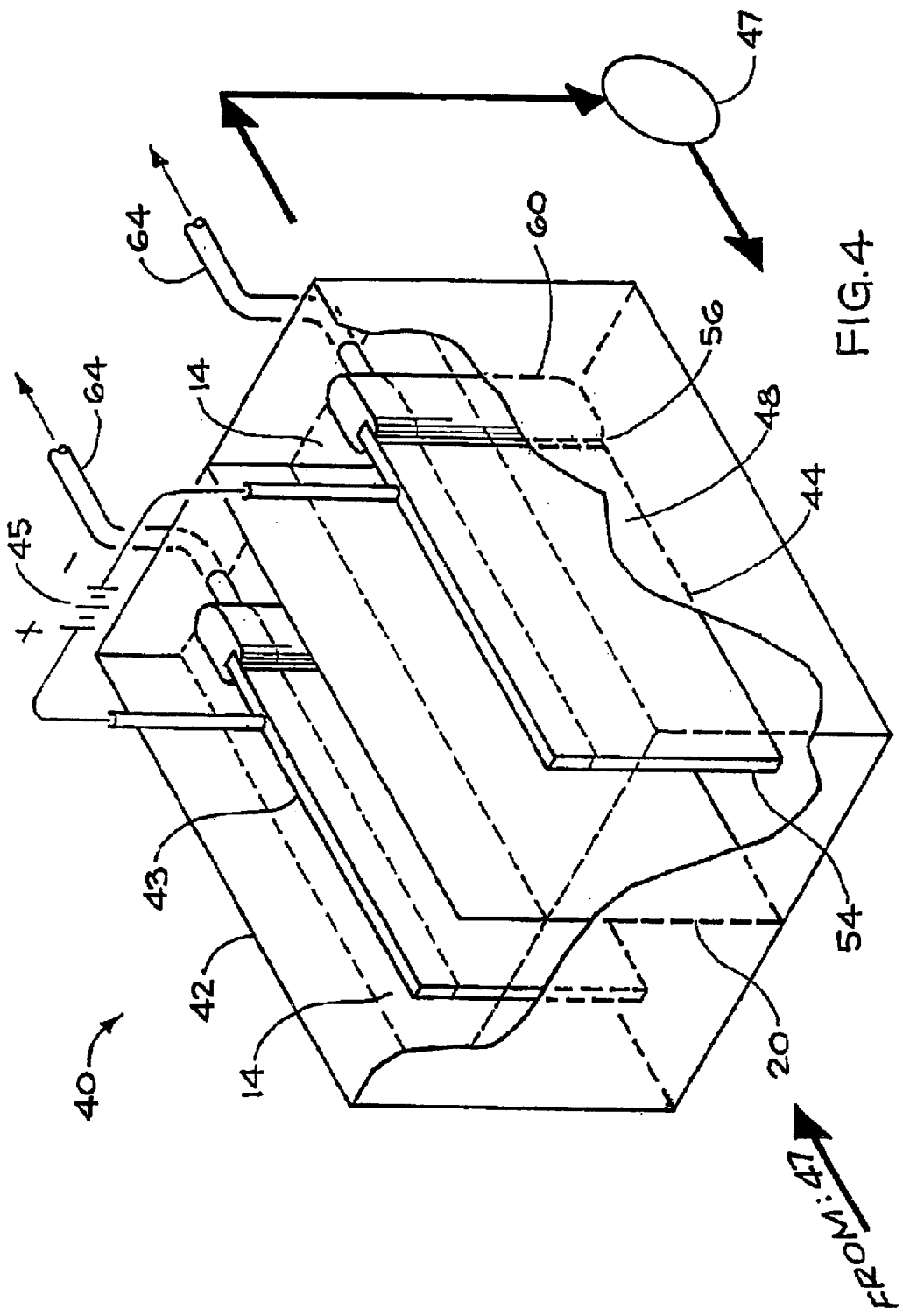
FIG. 4 is a partially schematic, partially cut-away, isometric view showing a simplified electrochemical cell according to the invention.
Figure 5:
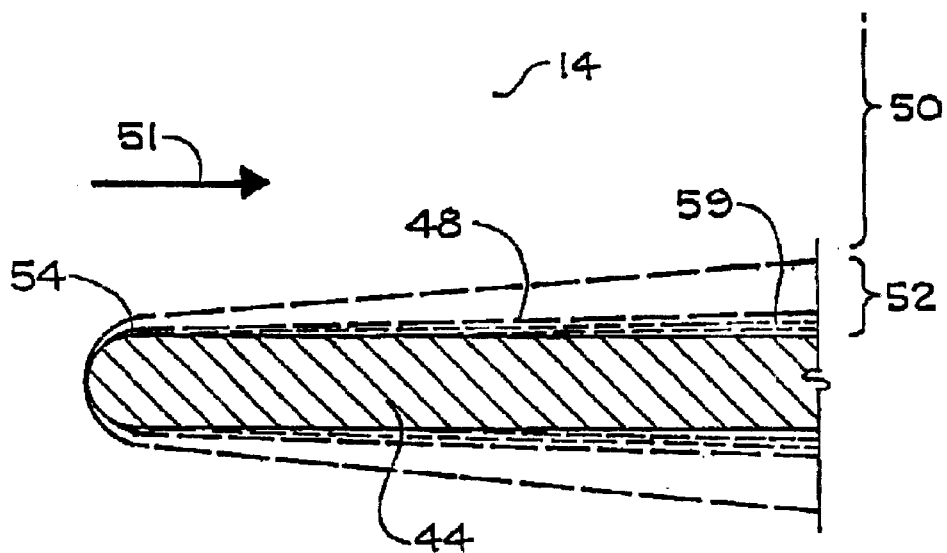
FIG. 5 is a fragmentary sectional view showing fluid flow in a region adjacent an upstream end of one of the electrodes in the electrochemical cell of FIG. 4.

FIG. 4 shows a electrochemical cell 40 according to this invention. Electrochemical cell 40 has a single chamber 42 containing electrolyte 14. An anode 43 and a cathode 44 are provided within chamber 42. Anode 43 is connected to the positive terminal of a suitable power supply 45 and cathode 44 is connected to the negative terminal of power supply 45.

Electrolyte 14 is circulated through chamber 42 by a fluid driving means, which typically comprises a pump 47, a gang of pumps, or one or more suitable eductors, so that the bulk 50 of electrolyte 14 between anode 43 and cathode 44 can be made to flow past and generally parallel to the surface 48 of cathode 44 with a velocity V, as indicated by arrows 51 (FIG. 51. The fluid driving means may be any practical device capable of generating flow in electrolyte 14.

Electrolyte 14 will have a near zero velocity immediately adjacent surface 48. In a thin hydraulic boundary layer 52 adjacent surface 48 there is a significant gradient to the velocity of electrolyte 14. The outer edge of hydraulic boundary layer 52 may be defined as the surface on which electrolyte 14 has a velocity 90% of the velocity of the bulk of electrolyte 14 (i.e. $0.9 \times V$). Those skilled in the art will realize that a boundary layer similar to boundary layer 52 will be formed adjacent the surface of anode 43. The step of causing fluid, such as electrolyte 14 to flow past surface 48 so as to cause fluid in a boundary layer region 52 to flow along surface 48 is identified as step 92 in FIG. 9.

The method continues by allowing a reaction product to form at surface 48 (step 94) . In an electrochemical cell 40, step 94 involves passing an electrical current between anode 43 and cathode 44 so that a reaction product is generated in an electrochemical reaction at surface 48.

This invention deliberately creates flow conditions wherein a reaction product generated at surface 48 and released into electrolyte 14 will become entrained in hydraulic boundary layer 52. Boundary layer 52 flows across surface 48 front an upstream side 54 to a downstream side 56 without mixing significantly with the bulk 50 of electrolyte 14. As a result, product species which are formed at or near surface 48 of cathode 44 will be carried along in the hydraulic boundary layer 52 toward the downstream side 56 of cathode 44 (step 96). The product species are carried to one or more locations where the product species may be collected (step 98).

While this example has described the collection of product species at a cathode (product species produced at a cathode may be termed a catholyte), the method of the invention may also be used to collect product species generated at anode 43 (such product species may be called anolytes) or species generated at the surface of a catalyst.

The fluid flow in hydraulic boundary later 52 should be kept from mixing with the bulk fluid flowing past surface 48. Preferably the fluid flow in boundary layer 52 is kept laminar. Some turbulence may exist in the bulk of the fluid as long as the flowing boundary layer 52 is not thereby caused to become mixed significantly with the bulk of the fluid. The invention could possibly also be practised in a flow regime wherein a turbulent boundary layer exists between surface 48 and the bulk of electrolyte 14 as long as there is not significant mixing between the turbulent boundary layer and the bulk of the electrolyte 14. It will be appreciated that there are many geometrical arrangements of fluid flows and surfaces which will result in fluid flowing across the surfaces in a hydraulic boundary layer without mixing significantly with the bulk of the fluid. In an electrochemical cell, the cell should preferably be shaped such that the electrolyte flows symmetrically between the electrodes and closely similar laminar flow patterns are maintained in the boundary layers adjacent each of the electrodes. It is not necessary for the electrodes to be very closely spaced. The electrodes may be spaced far enough apart that a fully developed laminar flow pattern does not exist in the region between the electrodes. Indeed, in an electrochemical cell it is often necessary for the electrodes to be separated by significant distances to permit accumulation of electrode-posited species and to prevent debris from building up between the electrodes to the point that the proper operation of the electrochemical cell is interfered with.

Depending upon the velocity V of flow in region 50, the boundary layer adjacent surface 48 may be quite thin. In typical electrochemical cell applications V will be in the range of about 0.02 m/s to about 0.3 m/s. With an aqueous electrolyte 14, if surface 48 has a width on the order of 1 meter and velocity V is on the order of 10 cm·s$^{-1}$, then hydraulic boundary layer 52 will be no more than about 1.5 cm to 2 cm in thickness. The thickness of hydraulic boundary layer 52 has been exaggerated in the drawings for clarity. Preferably surface 48 is spaced apart from other adjacent surfaces and objects by a distance significantly greater than (for example, at least 3 times) the thickness of hydraulic boundary layer 52.

A diffusion boundary layer 59 can be defined as the zone immediately adjacent surface 48 in which the reaction product has significant concentration. The outer limit of diffusion boundary layer 59 may be defined as a surface on which the concentration of the reaction product is a small percentage (e.g. 5% or 1%) of its maximum value. In general diffusion boundary layer 59 will be significantly thinner than hydraulic boundary layer 52. It is only necessary to remove the electrolyte from diffusion boundary layer 59 to recover almost all of the reaction product. Diffusion boundary layer 59 is typically not greater than about 2 millimeters in thickness. In the drawings the thickness of diffusion boundary layer 59 has been exaggerated for clarity.

By extracting a portion of boundary layer 52 which contains diffusion boundary layer 59 the concentration of the desired reaction product in the removed fluid will be significantly greater than it would be if the reaction product were allowed to mix with the bulk of electrolyte 14 and the mixed electrolyte 14 was removed from cell 40.

The thickness of diffusion boundary layer 59 is determined by the rate at which reaction product migrates away from surface 48. The reaction product may migrate from surface 48 toward the bulk of electrolyte 14 by one or more of several mechanisms. For example, some of the reaction product will diffuse into the bulk of electrolyte 14 by diffusion arising from the difference in concentration of the desired species between hydraulic boundary layer 52 and the remainder of electrolyte 14. Turbulent mixing within the flowing electrolyte can also give rise to migration of species from hydraulic boundary layer 52 into the electrolyte as a whole. To avoid this, laminar flow conditions should be maintained adjacent surface 48, as described above. Diffusion as a result of electrical gradients may also occur. If the rate of flow of the bulk of electrolyte 14 between cathode 44 and anode 43 is sufficiently high, all of the diffusion effects will be small compared to the main flow of electrolyte across surface 48, the thickness of layer 59 will be small, and very little reaction product will escape from hydraulic boundary layer 52 into the bulk of electrolyte 14.

Cell 40 includes fluid withdrawal means, indicated generally by 60, for collecting and withdrawing from the cell electrolyte 14 flowing in hydraulic boundary layer 52 which contains the desired reaction species. In general, fluid withdrawal means 60 should be constructed so that it does not disrupt the boundary layer flow of electrolyte 14 over surface 48.

Figure 6A:
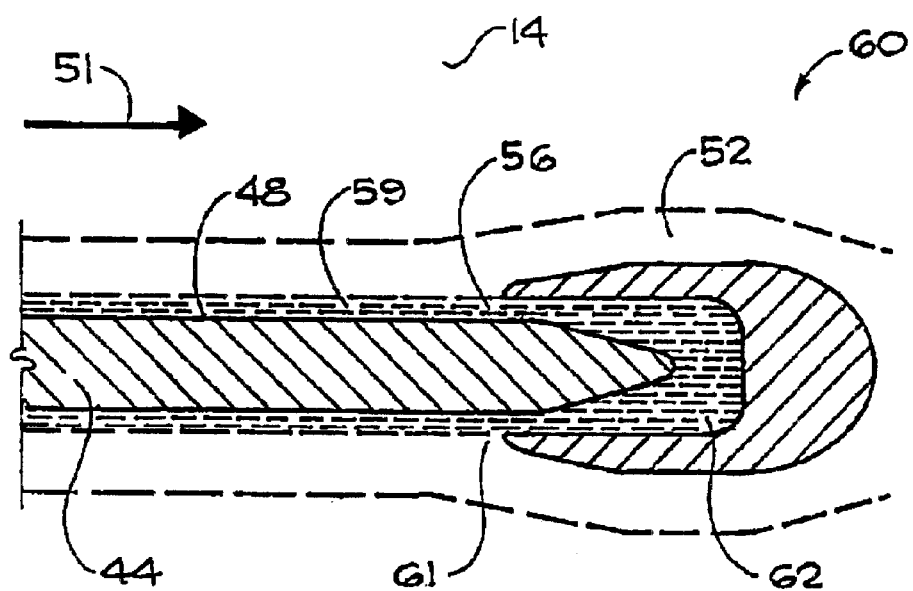
FIGS. 6A, 6B and 6C show various means for removing a reaction product species from a downstream collection zone in the electrochemical cell of FIG. 4.

Fluid withdrawal means 60 may comprise, for example, an elongated slot 61 along the downstream edge 56 of the surface 48 of an electrode (e.g. cathode 44) as shown in FIG. 6A. Suction is maintained in a plenum 62 behind slot 61 by any suitable means, such as a pump 82 connected to a plenum 62 by a suitable conduit 64. The point at which conduit 64 connects to plenum 62 may be called a suction port. The suction draws electrolyte 14 from hydraulic boundary layer 52 into plenum 62 from where it can be removed from the cell. Slot 61 may be quite narrow. For example, slot 61 may comprise a parallel-edged gap having edges on the order of 1 mm to 1.5 mm apart. It can be appreciated that slot 61 has dimensions much larger than the dimensions of pores in prior art porous electrodes. Slot 61 is therefore much less prone to plugging with debris than a typical porous electrode. The edges of slot 61 are preferably even with one another to avoid creating turbulence within boundary layer 52. Plenum 62 and slot 61 are configured so that there is a significant pressure drop between the inside and outside of slot 61.

Suitable baffles or the like may be placed behind slot 61 to maintain smooth flow patterns of fluid into slot 61 and to limit the amount of fluid drawn into slot 61. If slot 61 draws in much more fluid than is necessary then the concentration of the reaction product in the removed fluid will be reduced. In an extreme case the flow of fluid into slot 61 could interfere with the flow of fluid in boundary layer 52. Whether or not baffles are necessary and the design of such baffles are design details which are dependent upon the particular configuration of the apparatus in question and its conditions of operation in ways that will be apparent to those skilled in the art.

It is not necessary to remove the entire hydraulic boundary layer 52 from cell 40. In general, if laminar conditions are maintained in hydraulic boundary layer 52 then the reaction product species will lie in the layer 59 of hydraulic boundary layer 52 closest to surface 48. If diffusion boundary layer 59 does not mix significantly with the rest of boundary layer 52 then is only necessary to remove the portion of boundary layer 52 containing layer 59 to collect most of the reaction product species.

It can be appreciated that substantially all of the reaction product produced at surface 48 may be removed from cell 40 without withdrawing a large amount of electrolyte 14 from cell 40. The diffusion boundary layer 59 has a very small volume. Again, while the foregoing example describes collection of a reaction product at a cathode, the same methods could be used to collect a reaction product formed at a surface of an anode or a surface of a catalyst.

Figure 6B:
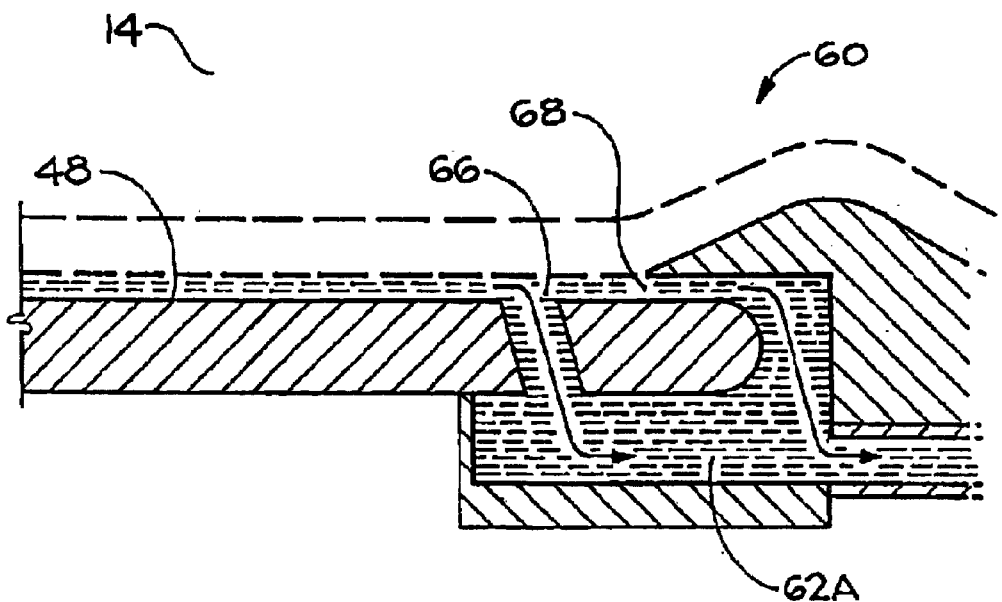

Those skilled in the art will realize that there are many possible arrangements for fluid removal means 60 which may be used to withdraw electrolyte 14 containing a reaction product from flowing hydraulic boundary layer 52 in its portion near the downstream edge 56 of surface 48. For example, FIG. 6B shows a fluid removal means SO comprising a plenum 62A in fluid connection with a pair of slots 66, and 68. Slot 66 penetrates surface 48 slightly upstream from slot 68.

Figure 6C:
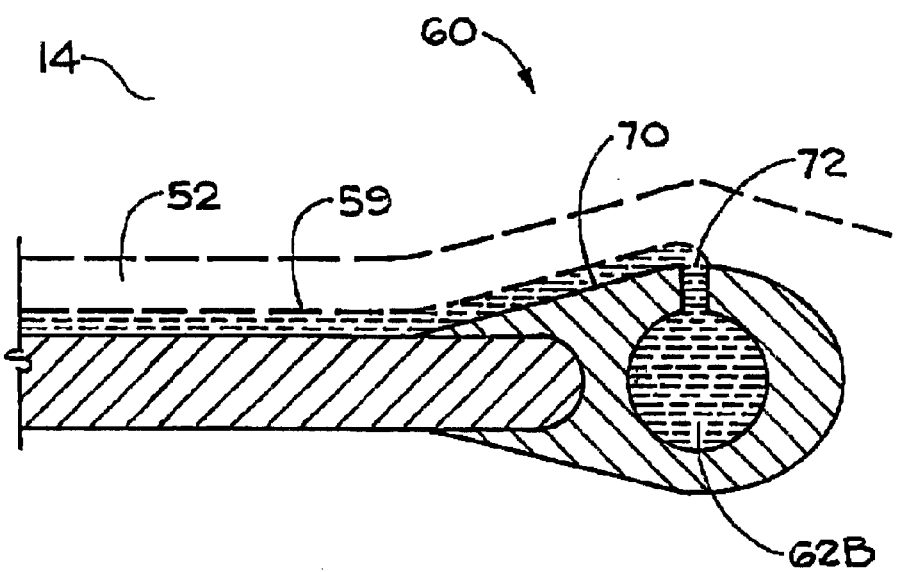

FIG. 6C shows yet another construction for a fluid removal means 60 in which hydraulic boundary layer 52 flows over a streamlined bump 70. Fluid containing a reaction product is removed through slot 72 into plenum 62B from where it is removed. The interior of plenum 62B is maintained at reduced pressure so that fluid is drawn into plenum 62B.

It can be appreciated that reactant species in boundary layer 52 will be depleted as those reactant species are consumed in the reactions which take place on surface 48. This can happen, for example, if the methods and apparatus of this invention are used in the process for electrowinning copper matte described in U.S. Pat. No. 5,622,615. That process results in copper metal being plated onto a cathode. At the same time, ferrous ions are oxidized to ferric ions at the anode. It is desirable to use the methods of this invention to remove a concentrated stream of ferric ions at the anode. One possible set of process conditions is set out in Table I.

TABLE I

| | |
|---|---|
| $Fe^{2+}$ concentration in electrolyte | 35 grams/liter |
| flow velocity past anode | 10 cm/s |
| average anode current density | 500 Amperes/$m^2$ |
| anode dimensions | 1 m x 1 m |
| gap between anode and cathode | 3 cm |
| anolyte withdrawal rate | 110 liters/hour |

Figure 7:
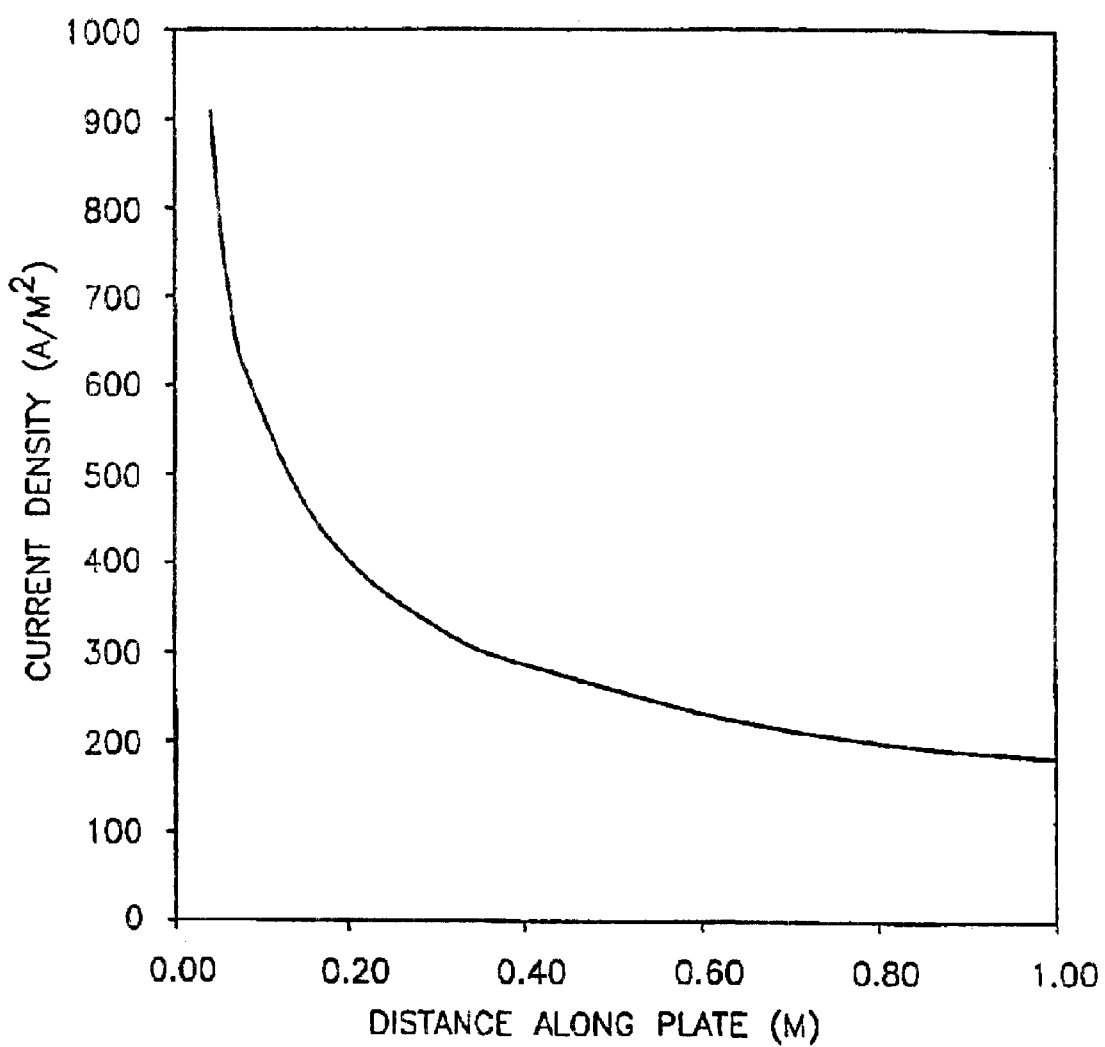
FIG. 7 is a plot of maximum attainable average current density as a function of distance across an anode in a copper electrowinning cell.

As the electrolyte in boundary layer 52 is swept along the anode the concentration of $Fe^{2+}$ ions in boundary layer 52 fails off as $Fe^{2+}$ ions are oxidized to $Fe^{3+}$ ions. Eventually the concentration of $Fe^{2+}$+ ions will be reduced to the point that the desired current density cannot be maintained in downstream portions of the anode. FIG. 7 shows a plot of the maximum obtainable average current density as a function of position along an anode in the direction of flow of boundary layer 52. The curve in FIG. 7 was generated from simulated data based upon the process conditions of Table I. It can be appreciated from FIG. 7 that after the boundary layer has flowed along the anode for a distance of about 0.15 meters, the concentration of $Fe^{2+}$ ions is depleted to the point that the desired average current density of 500 Amperes/$m^2$ can no longer be maintained. This problem can be reduced or eliminated in apparatus according to the invention by providing a fluid removal means 60 which removes fluid at several spaced apart locations across the surface of an electrode.

Figure 8B:
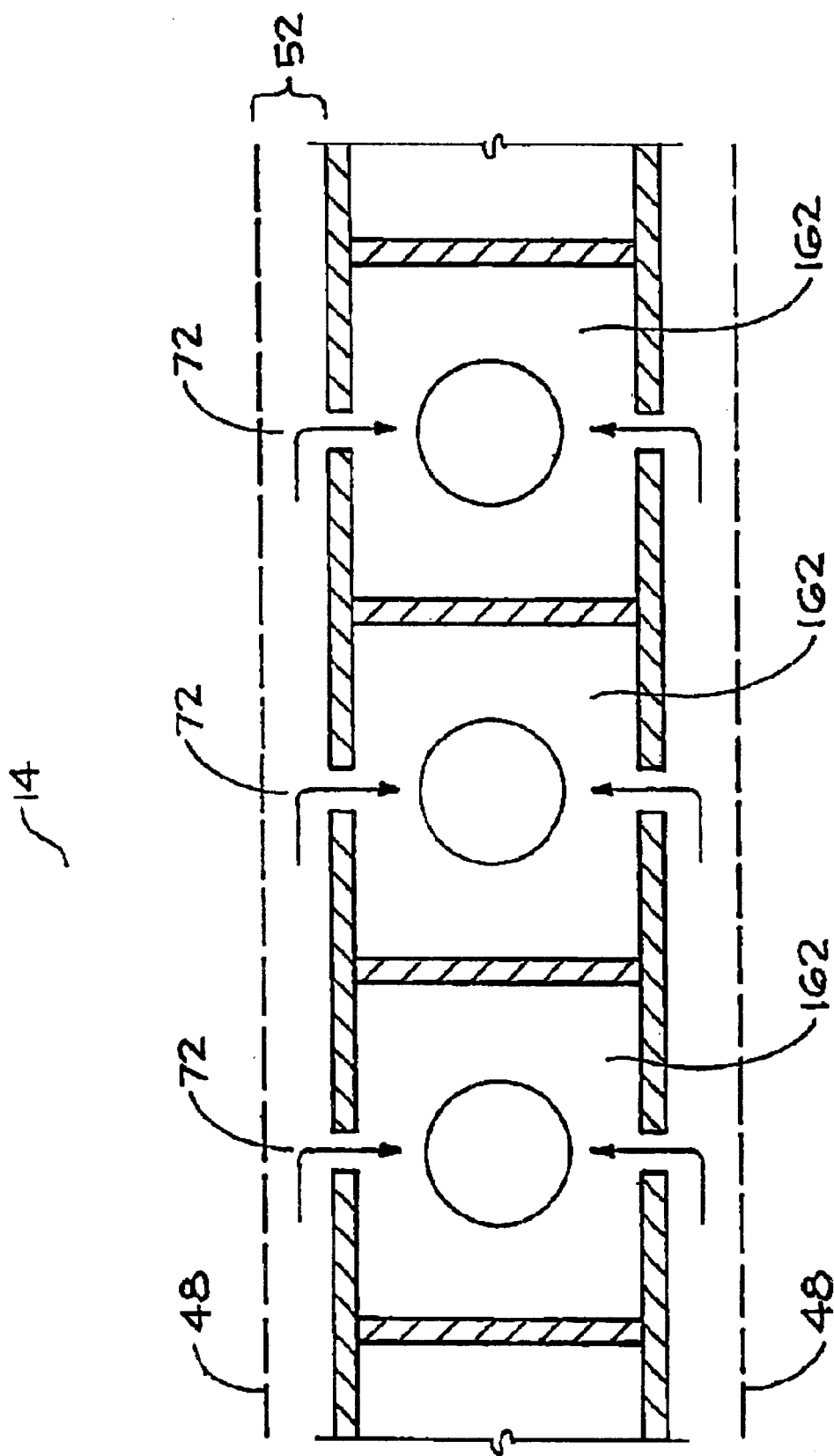

FIGS. 8A and 8B show one electrode (or a catalyst) having a surface 148 at which a reaction product is formed. In the embodiment of FIGS. 8A and 8B, the fluid removal means comprise a plurality of parallel slots 72 spaced apart or surface 148. Each slot 72 opens into a plenum chamber 162 located behind surface 148. The pressure within plenum chamber 148 is reduced by a pump 32 or some other suitable suction means so that fluid from layer 59 in boundary layer 52 is drawn into slots 72 as boundary layer 52 flows over slots 72. Slots 72 may all be connected to the suction means by a shared plenum 262, as shown, or may be connected to individual plenums. Each slot 72 stops at a depth below the level on the electrode which will be at the electrolyte surface when the electrode is in use. This prevents air from being sucked into slots 72.

If slots 72 are spaced closely enough together then depleted electrolyte is removed before it becomes so depleted that the performance of the electrode becomes adversely affected. The removal of depleted electrolyte at each location brings fresh electrolyte into the region 59 immediately adjacent surface 148.

A further advantage of the apparatus of FIG. 8A and 8B is that removing fluid from boundary layer 52 can stabilize boundary layer 52. If the flow in boundary layer 52 is such that a transition to turbulent flow conditions in the boundary layer night occur then such a transition may be prevented by withdrawing sufficient amounts of fluid through slots 72, thus stabilizing the laminar flow regime in boundary layer 52. This further reduces the possibility that significant amounts of product species can escape into the bulk of electrolyte 14 before being withdrawn into slots 72.

As will be apparent to those skilled in the art in the light of the foregoing disclosure, many alterations and modifications are possible in the practice of this invention without departing from the spirit or scope thereof. For example, While it is generally not be necessary to do so, it is possible to practice the method of invention in a divided cell by maintaining a sufficient flow of electrolyte past the surface of the electrodes in a divided cell and then removing the anolyte or catholyte from the trailing edge portion of the anode or cathode.

While several embodiments of fluid removal means 60 which are described above include elongated slots, a series of appropriately located openings, such as round holes, or square holes could be substituted for one or more slots without departing from the broad scope of the invention. The holes should preferably each have diameters large enough that they are not susceptible to becoming plugged.

Furthermore, while the invention has been described above in respect of an electrochemical cell, the invention could be used as well to collect the product of a chemical reaction which occurs at the surface of a solid catalyst.

While the invention has been described, for simplicity of illustration, with reference to flat surfaces 48 the invention is not limited to planar surfaces. Boundary layer flows capable of transporting a reaction product across a surface 48 to a collection zone without allowing the reaction product to diffuse significantly into the bulk of the surrounding fluid can be created with many surface geometries. For example, surface 48 could be the cylindrical surface inside a tube, one of a series of concentric surfaces, etc, While the direction of boundary layer flow has been illustrated as being horizontal across vertical surfaces, the boundary layer flow may he in some other direction. The surfaces need not be vertically oriented although in industrial electrochemical cells it is generally convenient to use planar rectangular vertically oriented electrodes. Accordingly, the scope of the invention is to be construed in accordance with the substance defined by the following claims.

What is claimed is:

1. A method for recovering a reaction product at a surface, the method comprising providing a surface immersed in a fluid;

allowing a reaction product to form at the surface;

causing the fluid to flow past the surface so as to cause fluid in a boundary layer region adjacent the surface to flow across the surface from an upstream side of the surface to a downstream side of the surface without mixing substantially with fluid from outside of the boundary layer region;

allowing the fluid flowing in the boundary layer region to carry the reaction product across the surface to a downstream collection zone without mixing substantially with fluid from outside of the boundary layer region; and, at the collection zone, collecting fluid flowing in the boundary layer region together with reaction product being carried by the fluid flowing in the boundary layer region.

2. The method of claim 1 wherein laminar flow conditions are maintained in the boundary layer region.

3. The method of claim 2 wherein the surface is a surface of a catalyst and the reaction product is formed at the surface by a chemical reaction catalysed by the catalyst.

4. The method of claim 2 wherein the surface is a surface of an electrode and the reaction product is formed at the electrode surface by an electrochemical reaction.

5. The method of claim 4 wherein the fluid is an electrolyte containing ferrous ions, the electrode is an anode, and the reaction product comprises ferric ions.

6. A method according to claim 4 wherein the electrode surface is spaced apart from a surface of another electrode by a distance which is at least 3 times a thickness of the boundary layer.

7. The method of claim 2 wherein the step of collecting the fluid flowing in the boundary layer region comprises drawing fluid flowing in the boundary layer region into an elongated aperture extending transversely to the direction of fluid flow as the fluid flowing in the boundary layer region arrives at the collection zone.

8. The method of claim 7 wherein the step of collecting the fluid comprises causing fluid in the boundary layer region to flow onto a smooth bump and the elongated aperture is located on the bump.

9. The method of claim 2 wherein the surface comprises a face of a first electrode in an electrochemical cell, the face of the first electrode faces toward a second electrode, and the step of causing the fluid to flow past the surface comprises directing a stream of fluid between the first and second electrodes.

10. The method of claim 9 wherein the stream of fluid has a velocity in the range of about 0.02 m/s to about 0.3 m/s.

11. The method of claim 2 comprising maintaining laminar flow conditions in a bulk portion of the fluid while collecting fluid at the collection zone.

12. A method for recovering a reaction product at a surface, the method comprising:
    providing a surface immersed in a fluid;
    allowing a reaction product to form at the surface;
    causing the fluid to flow past the surface so as to cause fluid in a boundary layer region adjacent the surface to flow across the surface from an upstream side of the surface to a downstream side of the surface without mixing substantially with fluid from outside of the boundary layer region;
    allowing the fluid flowing in the boundary layer region to carry the reaction product across the surface toward a downstream collection zone; and,
    at the collection zone, collecting fluid flowing in the boundary layer region together with reaction product being carried by the fluid flowing in the boundary layer region wherein a plurality of fluid removal means are provided on the surface, the fluid removal means located so that the fluid flowing in the boundary layer region passes at least two of the fluid removal means in flowing from the upstream side of the surface to the downstream side of the surface.

13. The method of claim 12 wherein the fluid removal means each comprise an elongated slot extending transversely to a direction of the boundary layer flow.

14. The method of claim 9 wherein the laminar flow conditions are maintained in the boundary layer region by withdrawing a sufficient quantity of fluid through the fluid removal means to prevent a transition to turbulence in the boundary layer region, thereby stabilizing the laminar flow in the boundary layer region.

15. An electrochemical cell comprising:
    a container holding a liquid electrolyte;
    first and second electrodes in the container in contact with the electrolyte;
    electrical conductors for connecting the first and second electrodes respectively to first and second poles of an electrical power supply;
    fluid driving means for causing electrolyte to flow past a surface of the first electrode with a velocity sufficient to cause the electrolyte in a boundary layer adjacent the surface to flow across the first electrode from an upstream side to a downstream side without mixing significantly with electrolyte from outside the boundary layer; and,
    fluid removal means on the surface at the downstream side of the surface for withdrawing fluid containing a reaction product from the boundary layer.

16. The electrochemical cell of claim 15 wherein the fluid removal means comprises an elongated slat oriented generally transversely to a direction of fluid flow in the boundary layer.

17. The electrochemical cell of claim 16 wherein the slot has a width in the range of about ½ millimeter to about 1½ millimeters.

18. The electrochemical cell of claim 15 wherein the fluid removal means comprises a plurality of elongated slots oriented generally transversely to a direction of flow of the fluid in the boundary layer, the slots spaced apart on the surface.

19. The electrochemical cell of claim 18 wherein the slots each have a width in the range of about ½ millimeter to about 1½ millimeters.

20. An electrode assembly for use in an electrochemical cell, the electrode assembly comprising:
    an electrically conductive surface;
    a first elongated opening extending along an edge portion of the surface;
    a plenum in fluid communication with the first elongated opening;
    one or more additional elongated openings in fluid connection with the plenum, the additional elongated openings extending generally parallel to the first elongated opening and spaced apart from the first elongated opening on the surface; and,
    a port connected to the plenum; wherein, when the electrode assembly is immersed in an electrolyte, fluid can be drawn into the first elongated opening and the additional elongated openings by applying suction to the port.

21. A method for recovering a reaction product at a surface, the method comprising:
    providing a surface immersed in a fluid and fluid driving means for causing the fluid to flow past the surface;
    operating the fluid driving means to cause the fluid to flow past the surface so as to cause fluid in a boundary layer region adjacent the surface to flow across the surface from an upstream side of the surface to a downstream side of the surface without mixing substantially with fluid outside of the boundary layer region;
    allowing a reaction product to form at the surface;
    allowing the fluid flowing in the boundary layer region to carry the reaction product across the surface to a fluid removal means in a downstream collection zone without mixing substantially with fluid outside of the boundary layer region; and,
    at the collection zone, operating the fluid removal means to withdraw fluid flowing in the boundary layer together with the reaction product.

22. A method for recovering a reaction product at a surface, the method comprising:
  providing a surface immersed in a fluid;
  flowing the fluid past the surface and thereby causing fluid in a boundary layer region adjacent the surface to flow across the surface from an upstream side of the surface to a downstream side of the surface without mixing substantially with fluid from outside of the boundary layer region, the fluid in the boundary layer region receiving a reaction product formed at the surface;
  allowing the fluid flowing in the boundary layer region to carry the reaction product across the surface to a first downstream collection zone on the surface;
  at the first collection zone, collecting fluid flowing in the boundary layer region together with reaction product being carried by the fluid flowing in the boundary layer region and drawing fresh fluid into the boundary layer region by withdrawing fluid from the boundary layer region into a first aperture in the surface;
  allowing fluid in the boundary layer region to flow from the first collection zone downstream to a second collection zone on the surface downstream of the first collection zone while the fluid in the boundary layer region receives more of the reaction product formed at the surface; and,
  at the second collection zone, withdrawing fluid from the boundary layer region into a second aperture in the surface and thereby collecting fluid flowing in the boundary layer region together with reaction product being carried by the fluid flowing in the boundary layer region.

23. The method of claim 22 comprising maintaining laminar flow conditions in the boundary layer region.

24. The method of claim 22 wherein the surface is a surface of a catalyst and the reaction product is formed at the surface by a chemical reaction catalysed by the catalyst.

25. The method of claim 22 wherein the surface is a surface of an electrode and the reaction product is formed at the electrode surface by an electrochemical reaction.

26. The method of claim 25 wherein the fluid is an electrolyte containing ferrous ions, the electrode is an anode, and the reaction product comprises ferric ions.

27. The method of claim 22 wherein the second aperture is an elongated aperture extending transversely to the direction of fluid flow as the fluid flowing in the boundary layer region arrives at the second collection zone.

28. The method of claim 27 comprising causing fluid in the boundary layer region to flow onto a smooth bump wherein the elongated aperture is located on the bump.

29. The method of claim 27 wherein the first aperture is an elongated slot extending transversely to a direction of the boundary layer flow in the first collection zone.

30. The method of claim 22 wherein the surface comprises a face of a first electrode in an electrochemical cell, the face of the first electrode faces toward a second electrode, and causing the fluid to flow past the surface comprises directing a stream of fluid between the first and second electrodes.

31. The method of claim 30 wherein the stream of fluid has a velocity in the range of about 0.02 m/s to about 0.3 m/s.

32. The method of claim 22 comprising maintaining substantially laminar flow conditions in a bulk portion of the fluid while collecting fluid at the first and second collection zones.

33. A method for recovering a reaction product at a surface, the method comprising:
  providing a surface immersed in a fluid;
  creating a bulk flow of fluid past the surface, so as to cause fluid in a boundary layer region adjacent the surface to flow across the surface from an upstream side of the surface to a downstream side of the surface without mixing substantially with fluid outside of the boundary layer region, the bulk flow being substantially unobstructed for a distance extending away from the surface by at least several times a thickness of the boundary layer region;
  allowing a reaction product to form at the surface;
  allowing the fluid flowing in the boundary layer region to carry the reaction product across the surface to a downstream collection zone on the surface; and,
  at the collection zone, collecting fluid flowing in the boundary layer region together with reaction product being carried by the fluid flowing in the boundary layer region.

34. The method of claim 33 wherein there is some turbulence in the bulk flow.

35. A method for electrowinning copper, the method comprising:
  providing an electrochemical cell comprising an anode and a cathode each having an active surface immersed in an electrolyte containing cupric ions and a reduced form of an oxidizing agent;
  passing an electrical current between the anode and the cathode through the electrolyte and thereby depositing copper metal at the cathode and generating an oxidized form of the oxidizing agent at the anode;
  at the anode, recovering the oxidized form of the oxidizing agent by:
    flowing the electrolyte past the active surface of the anode so as to cause electrolyte in a boundary layer region adjacent the active surface of the anode to flow across the active surface of the anode from an upstream side to a downstream side without mixing substantially with electrolyte from outside of the boundary layer region while the oxidized form of the oxidizing agent becomes entrained in the boundary layer flow;
    allowing the electrolyte flowing in the boundary layer region to carry the oxidized form of the oxidizing agent across the active surface of the anode to a downstream collection zone;
    at the collection zone, collecting electrolyte flowing in the boundary layer region together with the oxidized form of the oxidizing agent being carried by the electrolyte flowing in the boundary layer region; and,
  removing the oxidized form of the oxidizing agent from the electrochemical cell.

36. The method of claim 35 wherein the oxidized form of the oxidizing agent comprises ferric ions and the reduced form of the oxidizing agent comprises ferrous ions.

37. The method of claim 36 wherein the active surfaces of the anode and cathode face toward one another and flowing the electrolyte flow past the active surface of the anode comprises directing a stream of fluid between the active surfaces of the anode and cathode.

38. The method of claim 37 wherein the stream flows substantially horizontally.

39. The method of claim 37 wherein the stream of electrolyte has a velocity in the range of about 0.02 m/s to about 0.3 m/s.

* * * * *